US012736914B2

(12) United States Patent
Payne et al.

(10) Patent No.: US 12,736,914 B2
(45) Date of Patent: Sep. 15, 2026

(54) ATTACHMENTS TO PROVIDE AN ALIGNING FORCE

(71) Applicant: Hewlett-Packard Development Company, L.P., Spring, TX (US)

(72) Inventors: David M. Payne, Boise, ID (US); Justin Pettingill, Boise, ID (US); Jeffrey Luke, Boise, ID (US); Gabriel Scott McDaniel, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 19/102,855

(22) PCT Filed: Aug. 12, 2022

(86) PCT No.: PCT/US2022/040149

§ 371 (c)(1),
(2) Date: Feb. 10, 2025

(87) PCT Pub. No.: WO2024/035411

PCT Pub. Date: Feb. 15, 2024

(65) Prior Publication Data

US 2026/0056507 A1 Feb. 26, 2026

(51) Int. Cl.
*G03G 21/18* (2006.01)

(52) U.S. Cl.
CPC ..... *G03G 21/1842* (2013.01); *G03G 21/1853* (2013.01); *G03G 21/1864* (2013.01)

(58) Field of Classification Search
CPC ............. G03G 21/1842; G03G 21/185; G03G 21/1853; G03G 21/1857; G03G 21/186; G03G 21/1864
See application file for complete search history.

(56) References Cited

U.S. PATENT DOCUMENTS

| | | | | |
|---|---|---|---|---|
| 2004/0013446 | A1* | 1/2004 | Morioka | G03G 21/1867 399/111 |
| 2009/0028597 | A1 | 1/2009 | Takigawa et al. | |
| 2013/0260952 | A1* | 10/2013 | Matsuda | F16H 1/28 475/346 |
| 2019/0179257 | A1 | 6/2019 | Murakami et al. | |
| 2020/0301352 | A1 | 9/2020 | Matsumaru et al. | |
| 2020/0401080 | A1 | 12/2020 | Maeda | |

FOREIGN PATENT DOCUMENTS

| | | | |
|---|---|---|---|
| CN | 114488742 | A | 5/2022 |
| CN | 114488744 | A | 5/2022 |
| CN | 217238613 | U | 8/2022 |
| CN | 217484701 | U | 9/2022 |
| JP | 2009-270594 | A | 11/2009 |

OTHER PUBLICATIONS

Machine Translation of JP 2009-270594. (Year: 2009).*

* cited by examiner

*Primary Examiner* — Carla J Therrien
(74) *Attorney, Agent, or Firm* — Foley & Lardner LLP

(57) ABSTRACT

An example mountable set to be mounted in an image forming apparatus (100) includes a process cartridge (200) having a driven gear (210), the driven gear to couple with a driving gear (120) of the image forming apparatus and to receive a driving force from the driving gear and an attachment (300). The attachment includes a mounting portion (310) to mount to the image forming apparatus and a protruding portion (320), coupled to the mounting portion, to provide an aligning force to the driving gear.

15 Claims, 8 Drawing Sheets

ATTACHMENTS TO PROVIDE AN ALIGNING FORCE

CROSS-REFERENCE TO RELATED APPLICATIONS

U.S. National Stage Entry under 35 U.S.C. § 371 as a National Stage of PCT of International Application No.: PCT/US2022/040149, filed Aug. 12, 2022, which is hereby incorporated by reference in its entirety.

BACKGROUND

A process cartridge may support an operation of an image forming apparatus, such as supplying toner to an electrostatic latent image formed on a photoconductor to form a visible toner image. To replace the process cartridge, the process cartridge may be removed from a main body of the image forming apparatus, and a replacement process cartridge may be installed. The process cartridge may include a driven gear that is to couple with a driving gear of the image forming apparatus and be provided with a driving force. In some circumstances, the driving gear may be tilted. To provide for coupling of the driving gear to the driven gear of the cartridge, the driving gear is to be aligned with the driven gear of the cartridge.

BRIEF DESCRIPTION OF THE DRAWINGS

Various examples will be described below by referring to the following figures.

DETAILED DESCRIPTION

Figure 1:
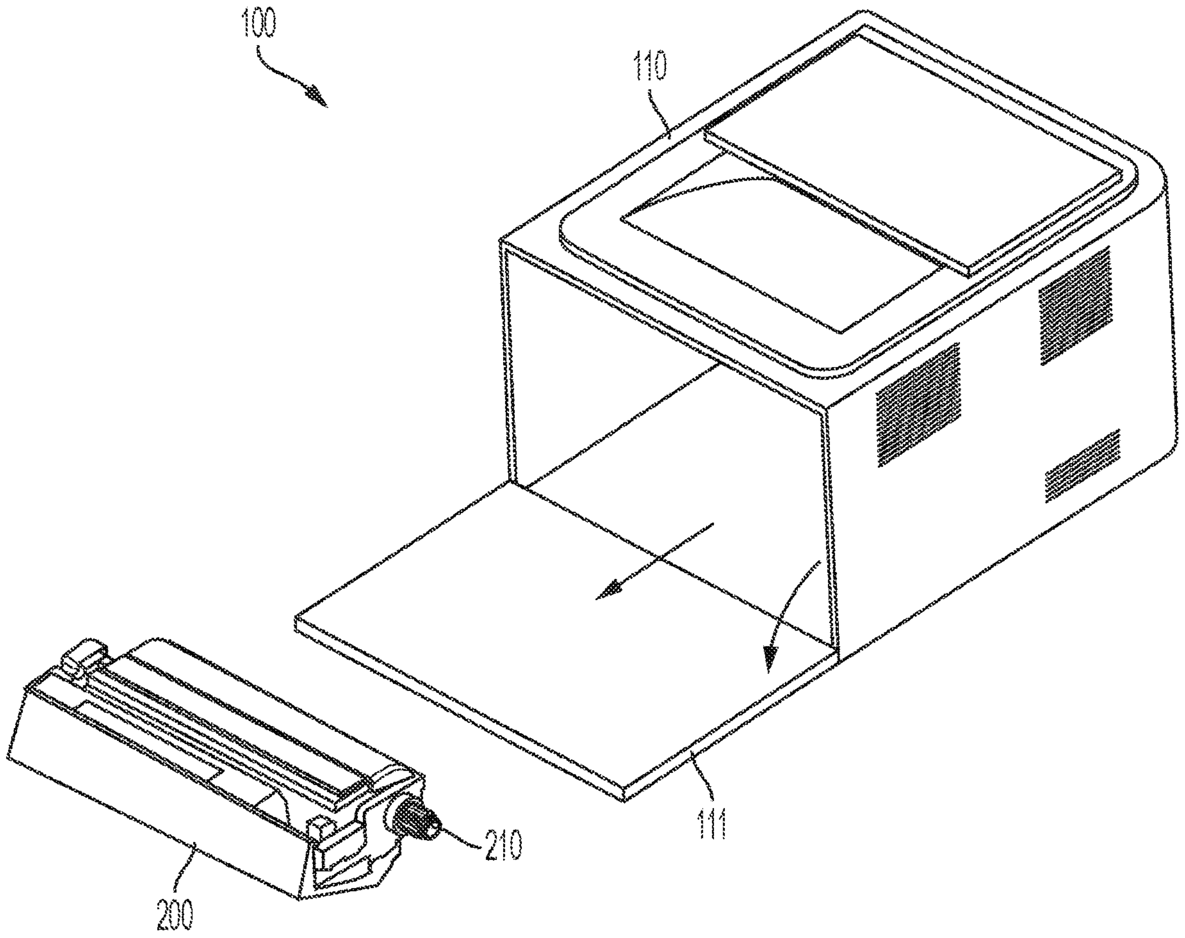
FIG. 1 is a perspective view of an image forming apparatus showing a state in which a process cartridge is separated from a case according to an example.

Hereinafter, various examples will be described with reference to the drawings to assist in an understanding of the disclosure and it should be understood that the disclosure may be modified and performed variously unlike in the examples described herein. Like reference numerals in the specification and the drawings denote like elements, and thus a redundant description may be omitted.

The terms used in the specification and claims have been selected as general terms in consideration of functions in the disclosure. But, these terms may vary in accordance with precedent, technical interpretation, the emergence of new technologies, and the like.

In the disclosure, the expression that a certain component is "connected" to another component includes a case in which the components are "directly connected to each other," and also a case in which the components are "connected to each other with another component interposed therebetween." In addition, a component that is described to "include" another component, may include still another component, rather than excluding it, unless otherwise noted.

A process cartridge may be attached to or detached from an image forming apparatus. In various examples, the process cartridge is to assist in an image forming operation and may contain toner, developer, etc., may include a photosensitive drum, a developing roller, etc., or may include additional components depending on implementation.

The process cartridge may include a driven gear that is to couple to a driving gear of the image forming apparatus and receive a driving force from the driving gear. As an example, in a case in which the process cartridge is a toner cartridge, the process cartridge may include an auger that is to mix and provide the toner to the image forming apparatus during an image forming operation. In that case, the auger may be connected to the driven gear to receive the driving force from the driving gear such that the auger may turn during an image forming operation. The image forming apparatus may include a driving mechanism connected to the driving gear to provide a driving force to the driving gear.

In some circumstances, the driving gear may tilt or otherwise be inclined. For example, in a situation in which the process cartridge is not installed in the image forming apparatus, such as during removal of the process cartridge for replacement, repair, etc., the driving gear may tilt.

To receive and couple to the driven gear of the process cartridge, the driving gear is to be aligned from the titled or inclined position such that the driving gear can mesh with the driven gear and the driving mechanism can provide a driving force. In previous implementations, the process cartridge may be formed to include a structure to contact the driving gear during installation of the process cartridge, wherein the contact of the structure to the driving gear forces the driving gear into an aligned position. However, a situation may occur in which the process cartridge is not formed to include such a structure. In that case, the driving gear is to be aligned by a different mechanism. Examples of the disclosure include various attachments to provide an aligning force.

FIG. 1 is a perspective view of an image forming apparatus showing a state in which a process cartridge is separated from a case of the image forming apparatus according to an example.

Referring to FIG. 1, an image forming apparatus 100 may include a case 110 having a front opening 111. The case 110 may form an exterior of the image forming apparatus 100. In various examples, the image forming apparatus 100 may perform an image forming operation such as generating, printing, copying, scanning, faxing, receiving, transmitting, etc. image data. For example, the image forming apparatus 100 may be a printer, a copier, a scanner, a fax machine, or a multi-function peripheral (MFP) that complexly implements functions of the printer, the copier, the scanner, and the fax machine through one apparatus, but there is no limitation.

A process cartridge 200 may be provided to support an image forming operation. As an example, the process cartridge 200 may contain toner to support an electrophotographic image forming process. A space to accommodate the process cartridge 200 may be located in the case 110 and the process cartridge 200 may be removably mounted within the image forming apparatus 100.

In various examples, the process cartridge 200 may be removed from the image forming apparatus 100 for replacement, repair, and the like. For example, the process cartridge 200 may reach an end-of-life condition, such by exhausting a supply of toner. In that case, a user may remove the process cartridge 200 and may replace the removed process cartridge 200 with another (e.g., a new, refurbished, etc.) process cartridge 200. As an example, the user may open the front opening 111 provided on the case 110 and may move the process cartridge 200 rearward with respect to the case 110, whereby the case 110 and the process cartridge 200 can be separated from each other. In the example of FIG. 1, the image forming apparatus 100 is shown having the front opening 111 in an open position and the process cartridge 200 located outside of the case 110.

To assist with installation of the process cartridge 200 into the image forming apparatus 100, the case 110 and the process cartridge 200 may include complementary guide structures. For example, the process cartridge 200 may include a rail (not shown) on each lateral side of the process cartridge 200 and the case 110 may include complementary rails (not shown) to guide the process cartridge 200 into a location suitable for an image forming operation.

Figure 2:
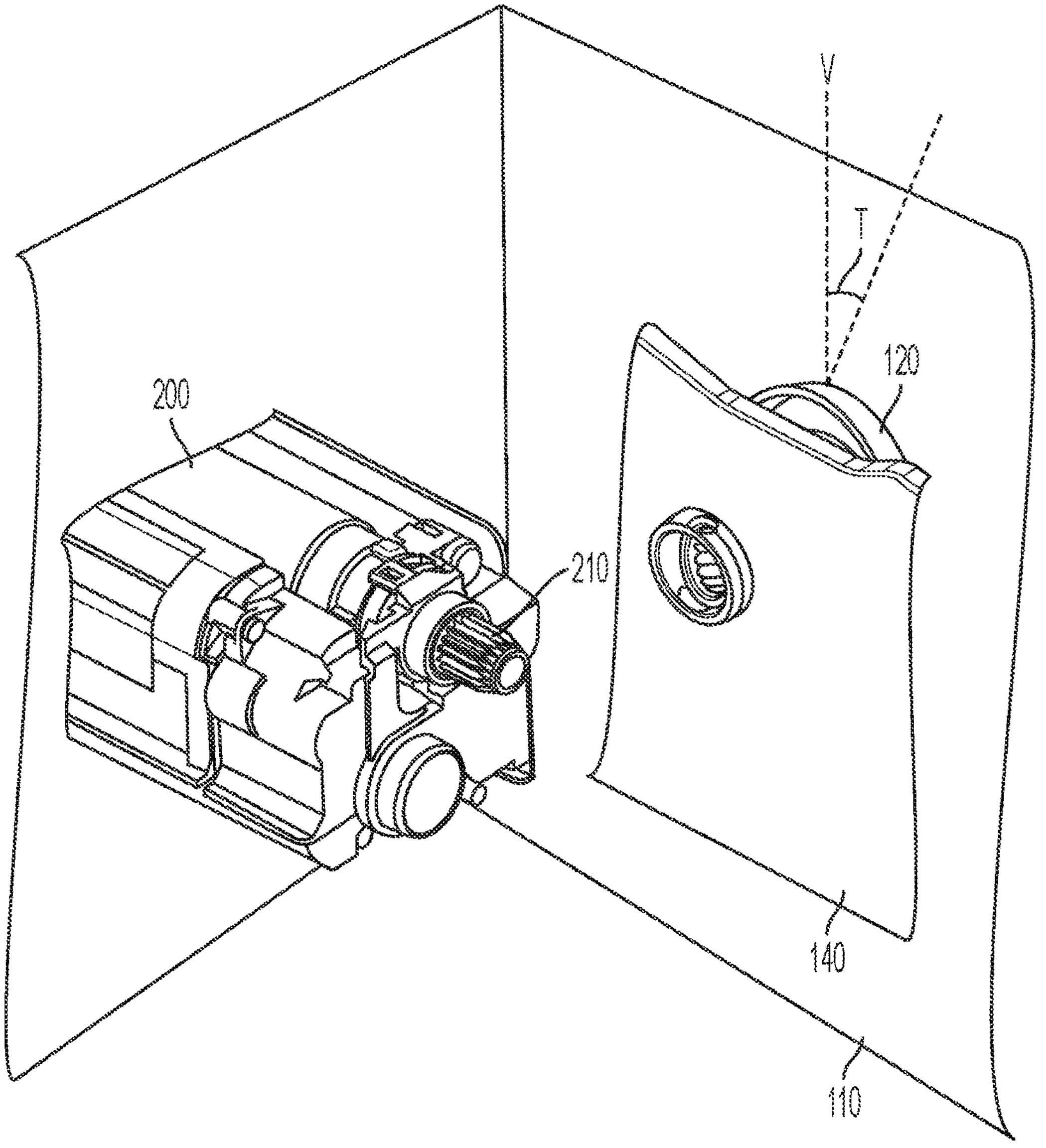
FIG. 2 is a partially exploded perspective view illustrating an installation of a process cartridge in an image forming apparatus according to an example.

FIG. 2 is a partially exploded perspective view illustrating an installation of a process cartridge in an image forming apparatus according to an example.

Referring to FIG. 2, the process cartridge 200 may include a driven gear 210. In an example, the driven gear 210 may couple to a component located inside of the process cartridge 200 that is to receive a rotational force to support an image forming operation. For example, the driven gear 210 may couple to an auger located inside the process cartridge 200 that is to rotate so as to mix and provide toner from within the process cartridge 200 to the image forming apparatus 100. Although not shown, the process cartridge 200 may also include an opening through which toner may be provided to the image forming apparatus 100. In other examples, the driven gear 210 may couple to another component within the process cartridge 200 such as an organic photoconductor, a developer roller, and the like.

The image forming apparatus 100 may include a driving gear 120. The image forming apparatus 100 may also include an interior panel 140 and a housing 130 as examples of structures to support the driving gear 120. In an example, the housing 130 may be provided within or otherwise coupled to the interior panel 140, and the housing 130 may receive therein or otherwise couple to the driving gear 120. Based on the process cartridge 200 being installed in the image forming apparatus such that the driven gear 210 is coupled to the driving gear 120, the driving gear 120 may provide a rotational force to the driven gear 210. In an example, the driving gear 120 may be rotated by e.g., a driving motor (not shown) provided in the case 110 of the image forming apparatus 100.

As illustrated in FIG. 2, in a situation in which the process cartridge 200 is not installed in the case 110, the driving gear 120 may be tilted or inclined relative to a vertical orientation. For example, the driving gear 120 may be tilted at an angle T relative to a vertical orientation V. The tilting of the driving gear 120 may occur for any of a variety of reasons such as a weight of the driving gear 120, a driving mechanism coupling the driving gear 120 to the driving motor, a linkage or other coupling of the driving gear 120 to the front opening 111 to cause the driving gear 120 to tilt and withdraw from the driven gear 210 for ease of installation/removal of the process cartridge 200, and the like.

To align the driving gear 120 to an orientation at which the driving gear 120 is able to couple with the driven gear 210, the driving gear 120 may receive an aligning force. In an example, the driving gear 120 and the driven gear 210 may be oriented in a substantially horizontal plane with regard to a rotational axis of the driving gear 120 and the driven gear 210. In previous implementations, the process cartridge 200 may be formed to include an integrated structure to provide an aligning force to the driving gear 120. However, there may occur a situation in which the process cartridge 200 does not include such a structure. In that case, the driving gear 120 would not be oriented to receive the driven gear 210 and would be unable to couple with the driven gear 210. According to various disclosed examples, an attachment is provided, wherein the attachment is to provide an aligning force to a driving gear. In other various examples, a mountable set is provided including a process cartridge and an attachment to provide an alignment force to a driving gear.

Figure 3A:
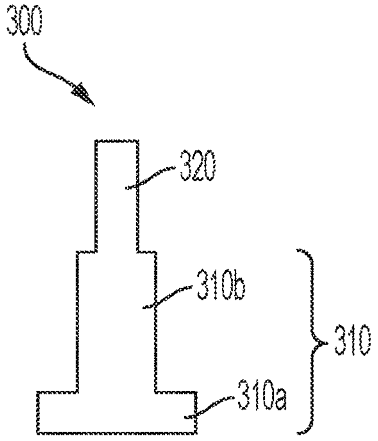
FIGS. 3A and 3B illustrate examples of an attachment to provide an aligning force.
Figure 3B:
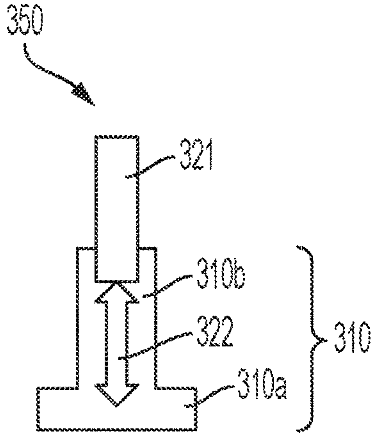

FIGS. 3A and 3B illustrate examples of an attachment to provide an aligning force.

Referring to FIG. 3A, an attachment 300 may include a mounting portion 310 and a protruding portion 320. In an example, the mounting portion 310 is to mount the attachment 300 to an image forming apparatus, such as the image forming apparatus 100 of FIGS. 1 and 2, and the protruding portion 320, which is coupled to the mounting portion 310, is to provide an aligning force to a driving gear, such as the driving gear 120 of FIG. 2.

The mounting portion 310 may include a head portion **310*a* and a stud portion 310*b*. A cross-sectional shape of the head portion 310*a* may include a circle, a square, a hexagon, an oval, and the like. A cross-sectional shape of the stud portion 310*b* and the protruding portion 320 may similarly include a circle, a square, a hexagon, an oval, and the like and may each be formed having the same cross-sectional shape or a different cross-sectional shape as the head portion 310*a*. In an example, the stud portion 310*b* may be at least partially threaded to receive a fastener, such as a nut (see FIG. 5). The attachment 300, including the head portion 310*a*, the stud portion 310*b*, and the protruding portion 320**, may be formed of a plastic, a metal, etc., and may be formed as continuous portions.

Referring to FIG. 3B, an attachment 350 may include the mounting portion 310 that includes the head portion **310*a* and the stud portion 310*b*. In the example of FIG. 3B, the attachment 350 includes a protruding portion 321. The protruding portion 321 is received within an opening of the stud portion 310*b*. The attachment 350 may also include an urging member 322 to provide an elastic force to the protruding portion 321 in a direction that separates the protruding portion 321 from the stud portion 310*b*. The urging member 322 may include a coil spring within the opening of the stud portion 310*b* to provide the elastic force to the protruding portion 321. In an example, the urging member 322 may have a first end that is supported by a bottom of the opening of the stud portion 310*b* and a second end, opposite the first end, to contact a lower end of the protruding portion 321**.

Although not shown, the lower end of the protruding portion 321 may include a flange or other structure that may be captured by a shoulder of the stud portion **310*b* that is located at the opening. In that case, the shoulder of the stud portion 310*b* may interfere with the flange or other structure of the protruding portion 321 to prevent the protruding portion 321 from escaping the stud portion 310***b* due to the elastic force of the urging member 322.

In various example implementations, the attachment 300 or the attachment 350 may be installed in an image forming apparatus to provide an aligning force to a driving gear. The attachment 300 or the attachment 350 may be installed by using any of several different methods, such as being affixed to an interior structure of the image forming apparatus, inserted through a hole in the image forming apparatus, connected by a mounting device to the image forming, apparatus, and the like. By installing the attachment 300 or the attachment 350 in the image forming apparatus, an aligning force may be provided by the respective protruding portion 320 or 321 to a driving gear.

Figure 4:
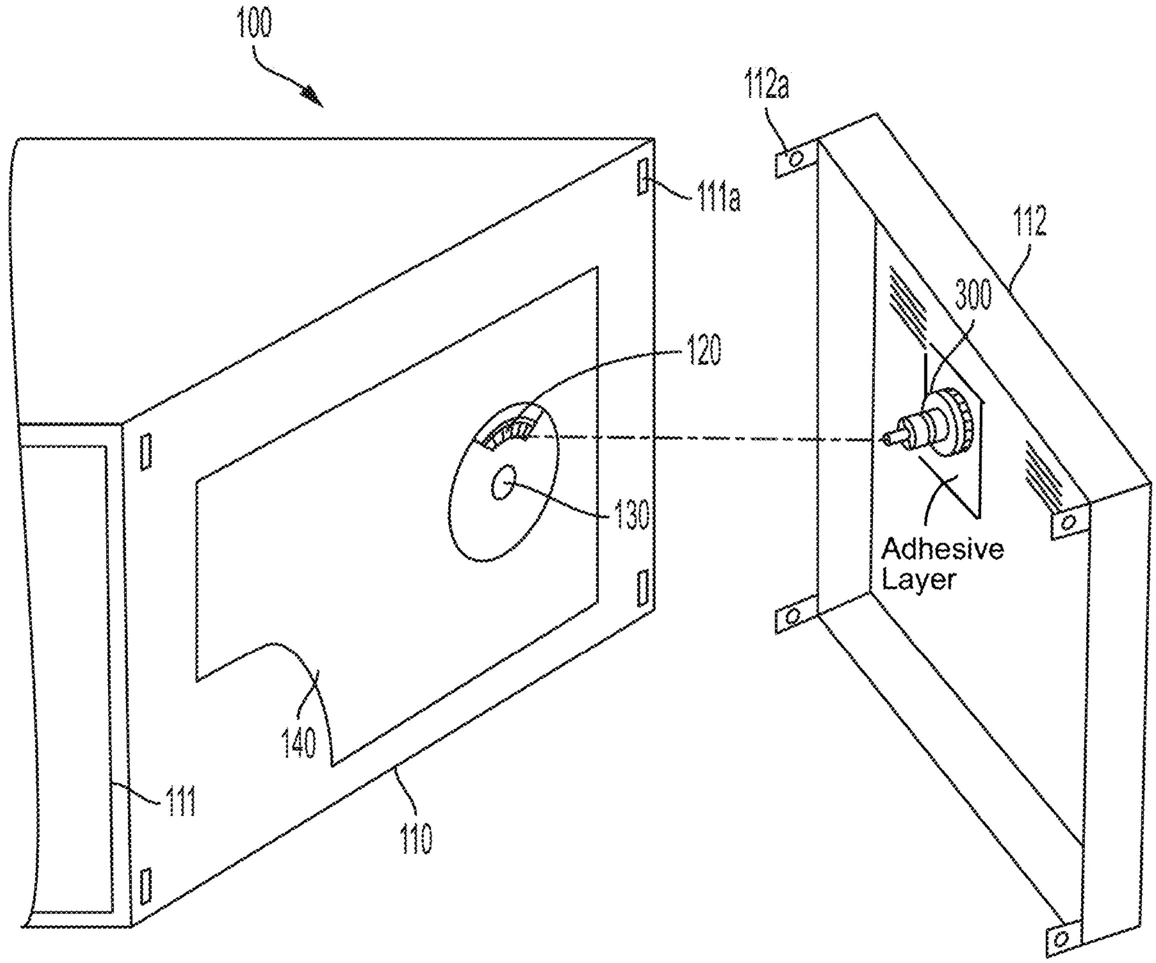
FIG. 4 illustrates the attachment of FIG. 3A installed in an image forming apparatus according to an example.

FIG. 4 illustrates the attachment 300 installed in the image forming apparatus 100 according to an example.

Referring to FIG. 4, the attachment 300 may be installed in the image forming apparatus 100. In the example of FIG. 4, the attachment 300 is illustrated. However, this is not to be construed as limiting and in other examples, the attachment 350 may be installed in the image forming apparatus 100.

In the illustrated example, the image forming apparatus 100 includes a side panel 112 that may be removed to access an internal structure of the image forming apparatus 100. The side panel 112 may include a connecting device such as a tab 112*a* and the image forming apparatus 100 may include a corresponding connecting device such as a recess 110*a*. The number and location of tabs 112*a* may correspond to the number and location of recesses 110*a* such that the side panel 112 may be removably attached to the image forming apparatus 100. In other examples, the connecting device may be implemented by a mechanism other than tab 112*a* to removably couple the side panel 112 to the image forming apparatus 100, such as a screw, a clip, and the like.

By removing the side panel 112, an internal structure of the image forming apparatus 100 may be accessed. As illustrated in the example of FIG. 4, the internal structure of the image forming apparatus 100 may include the housing 130 and the interior panel 140. In more detail, by removing the side panel 112, access may be obtained to a back side of the housing 130 and a back side of the interior panel 140, the back side being opposite to a front side that is to receive the driven gear 210 of the process cartridge 200. Further, the internal structure of the image forming apparatus 100 may provide access to a back side of the driving gear 120 through an opening 141 of the interior panel 140.

The attachment 300 may be mounted to the side panel 112 at a mounting location such that the protruding portion 320 of the attachment 300 provides an alignment force F to the driving gear 120. In an example, the mounting location of the attachment 300 may be determined such that, based on the side panel 112 being attached to the image forming apparatus 100, the protruding portion 320 of the attachment 300 contacts the driving gear 120 through the opening 141 of the interior panel to provide an aligning force to the driving gear 120. In an example, the mounting location of the attachment 300 may be determined using a template.

The attachment 300 may be mounted to the image forming apparatus 100 by various example methods. In the example of FIG. 4, the attachment 300 is mounted to the side panel 112 by an adhesive layer, which may include a double-sided tape, an epoxy layer, a polyurethane layer, and the like. In other examples, the attachment 300 may be mounted to the image forming apparatus 100 by a mounting device, such as a screw, a clip, and the like, or may be inserted through a hole provided in the image forming apparatus and secured with a nut, an example of which is provided with reference to FIG. 5.

Figure 5:
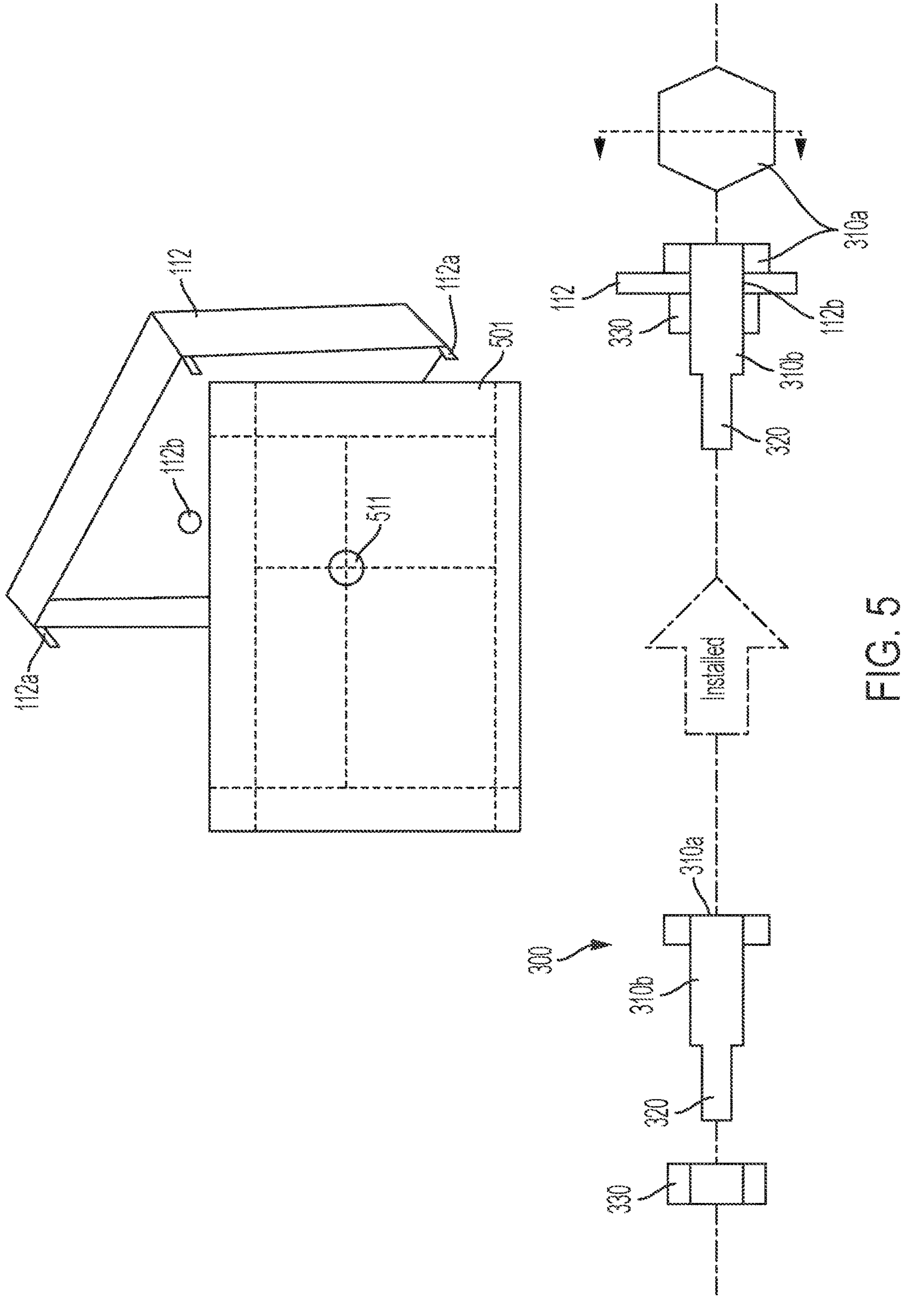
FIG. 5 illustrates an installation process of an attachment according to an example.

FIG. 5 illustrates an installation process of the attachment 300 in the image forming apparatus 100 according to an example.

Referring to FIG. 5, the side panel 112 may include a hole 112*b* to receive the attachment 300. In various examples, the hole 112*b* may be formed in the side panel 112 by a user. In that case, a location determining device 501, such as a template, may be provided to determine a location at which to form the hole 112*b* corresponding to the mounting location of the attachment 300. In various examples, the template 501 may include a mounting location indicator 511 to determine a location at which to form the hole 112*b*. In various examples, the template 501 may be aligned using a feature of the side panel 112, such as a corner of the side panel 112.

Based on the hole 112*b* being formed in the side panel 112, the attachment 300 may be inserted through the hole 112*b*. To secure the attachment 300 within the hole 112*b*, a nut 330 may be provided to couple with the attachment 300. For example, the stud portion 310*b* may be at least partially threaded to receive the nut 330. In the illustrated example of FIG. 5, based on installation of the attachment 300 in the hole 112*b*, the head portion 310*a* is located on an exterior side of the side panel 112 and the nut 330 and remaining portion of attachment 300 are located on an interior of the side panel 112. In that case, the side panel 112 may be re-installed on the image forming apparatus 100 and the attachment 300 may provide an aligning force to a back side of the driving gear 120 through the opening 141 in the interior panel 140.

In the example of FIG. 5, the head portion 310*a* of the attachment 300 is shown having a hexagonal cross-section. However, this is not to be construed as limiting and in other examples, the head portion 310*a* may have a different cross-section, such as a circle, a square, an oval, or the like. Also, in the example of FIG. 5, the attachment 300 is illustrated. However, this is not to be construed as limiting and in other examples, the attachment 350 may be installed in the hole 112*b*. In an example in which attachment 350 is installed in the hole 112*b*, the protruding portion 321 may provide an aligning force to a back side of the driving gear 120 through the opening 141 in the interior panel 140.

Figure 6A:
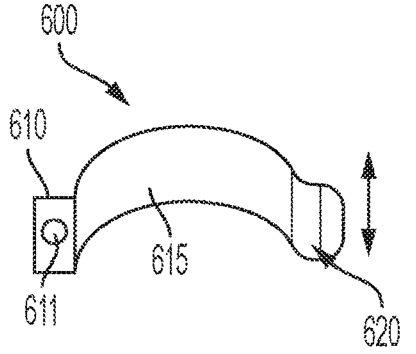
FIGS. 6A and 6B illustrate an attachment and installation of the attachment in an image forming apparatus according to an example.
Figure 6B:
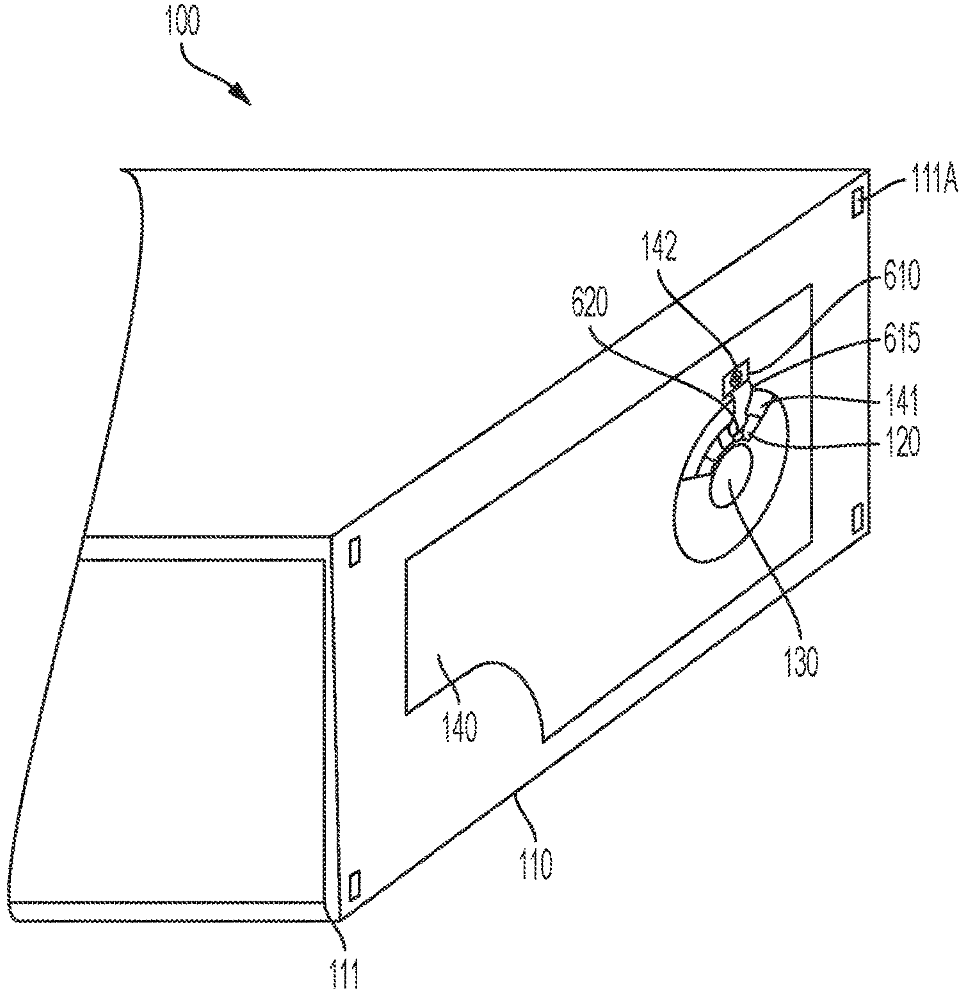

FIGS. 6A and 6B illustrate an attachment and installation of the attachment in an image forming apparatus according to an example.

Referring to FIG. 6A, an attachment 600 may include a mounting portion 610 and a protruding portion 620. The mounting portion 610 may include a head portion 611 to mount to an image forming apparatus, such as the image forming apparatus 100. The mounting portion 610 may include a bracket 615 coupled between the head portion 611 and the protruding portion 620. In the illustrated example, the head portion 611 may include a through-hole to receive a mounting device such as a screw, a clip, and the like that may connect the attachment 600 to the image forming apparatus. In an example, a location of the head portion 611 may correspond to a location of an existing mounting device of the image forming apparatus.

In an example, the attachment 600 including the mounting portion 610, the head portion 611, the bracket 615, and the protruding portion 620 may be formed as a continuous part. In various examples, the mounting portion 610, the head portion 611, the bracket 615, and the protruding portion 620 may be formed of a material having an elastic property, such as a metal, a plastic, or the like. In that case, the attachment 600 may provide an alignment force in response to the attachment 600 being deformed in an opposite direction to a direction of the alignment force. In an example implementation, the head portion 611 of the attachment 600 may be mounted to an image forming apparatus using an existing mounting device of the image forming apparatus.

Referring to FIG. 6B, an example is illustrated in which the attachment 600 is mounted in the image forming apparatus 100. In an example, the attachment 600 is mounted to the interior panel 140 within the image forming apparatus 100 that is accessible by removing the side panel 112.

In an example, the attachment 600 may be mounted to the back side of the interior panel 140 by connecting the head portion 611 to an existing mounting device 142. For example, the image forming apparatus 100 may include various internal components that are connected to the interior panel 140 using the existing mounting device 142. In that case, the existing mounting device 142 may be temporarily removed so that the attachment 600 may be mounted by connecting the head portion 611 to the existing mounting device 142. For example, in a case in which the existing mounting device 142 is a screw, the screw may be temporarily removed and inserted into a through-hole in the head portion 611. The screw may be reattached to the interior panel 140 such that the attachment 600 may be mounted to the interior panel 140 based on the coupling of the head portion 611 and the existing mounting device 142.

In other examples in which the existing mounting device 142 is not provided in the image forming apparatus 100, a separate mounting device may be provided to mount the attachment 600 to the panel 140. For example, a template may be provided, indicating a location at which to form a hole in the panel 140, and a mounting device, such as a screw may be provided to be received in the hole formed in the panel 140. In that case, the attachment 600 may be mounted to the panel 140. In other examples, the attachment 600 may be mounted to the panel 140 using an adhesive, a double-sided tape, and the like.

The protruding portion 620 extends from the bracket 615 and the bracket 615 extends from the mounting portion 610. Based on the attachment 600 being mounted to the interior panel 140, the protruding portion 620 may be received in the opening 141 of the interior panel 140 to contact the back side of the driving gear 120 and provide an aligning force.

In an example, the extension of the protruding portion 620 and the extension of the bracket 615 may be formed to have an elastic force. For example, the attachment 600, including the mounting portion 610, the bracket 615, and the protruding portion 620, may be formed of a metal, a plastic, and the like. In that case, a form of the bracket 615 and the protruding portion 620 may have a curve or other shape that provides an elastic force upon compression of the protruding portion 620.

Figure 7A:
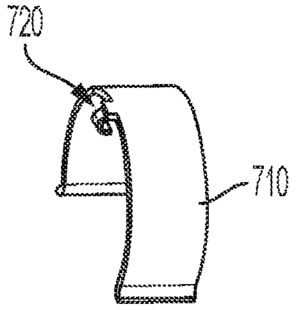
FIGS. 7A and 7B illustrate an attachment and installation of the attachment in an image forming apparatus according to an example.
Figure 7B:
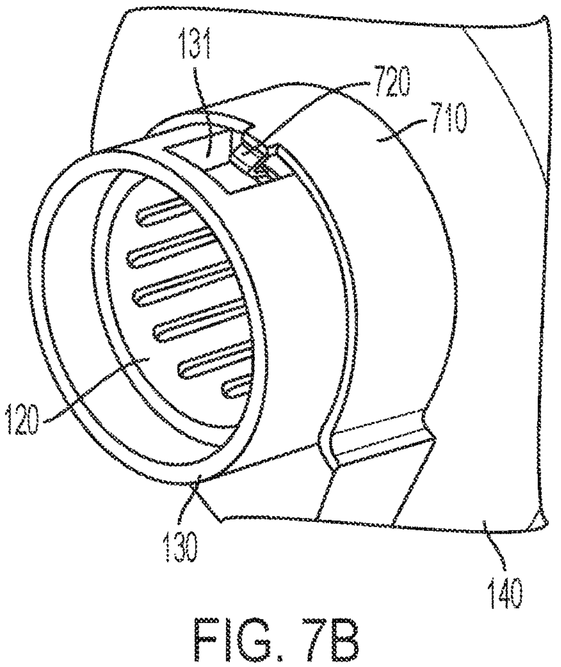

FIGS. 7A and 7B illustrate an attachment and installation of the attachment in an image forming apparatus according to an example.

Referring to FIG. 7A, an attachment 700 includes a mounting portion 710 and a protruding portion 720. In an example, the attachment 700 is to be mounted to a housing of a driving gear, such as the housing 130 of the driving gear 120 of the image forming apparatus 100.

To mount to a housing of a driving gear, the mounting portion 710 may include a shape corresponding to a shape of the housing of the driving gear. In that case, the attachment 700 may be connected to the housing of the driving gear without the use of a mounting device.

Referring to FIG. 7B, an example is illustrated in which the attachment 700 is installed in the image forming apparatus 100. In the example of FIG. 7B, the mounting portion 710 is connected to the housing 130 of the driving gear 120. In the example of FIGS. 7A and 7B, the attachment 700 has a semi-circular form in which a radius of the attachment 700 corresponds to a radius of the housing 130. The attachment 700 may be formed of an elastic material such as a plastic or a metal that may expand from and contract to the radius of the semi-circle for attachment to the housing 130. For example, the mounting portion 710 may be expanded while being placed to surround the housing 130 and contract to maintain contact with the housing 130.

The protruding portion 720 may be received in an opening 131 of the housing 130. The opening 131 of the housing 130 may provide access to the driving gear 120. For example, the opening 131 of the housing 130 may provide access to a top surface of the driving gear 120. The protruding portion 720 that is received in the opening 131 may extend through the opening 131 to provide an aligning force to the driving gear 120.

In an example, the protruding portion 720 may be formed to have elasticity in the direction of the aligning force. For example, the protruding portion 720 may be formed to have a curve or other shape that provides an elastic force based on compression of the protruding portion 720.

In other various examples, the attachment 700 may be connected to the housing 130 of the driving gear 120 by a double-sided tape, an adhesive, a mounting device such as a screw, a clip, or the like. As an example, the double-sided tape or adhesive may be provided as a layer between the mounting portion 710 and the housing 130.

Figure 8A:
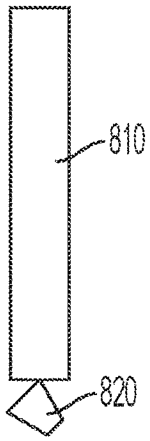
FIGS. 8A and 8B illustrate an attachment and installation of the attachment in an image forming apparatus according to an example.
Figure 8B:
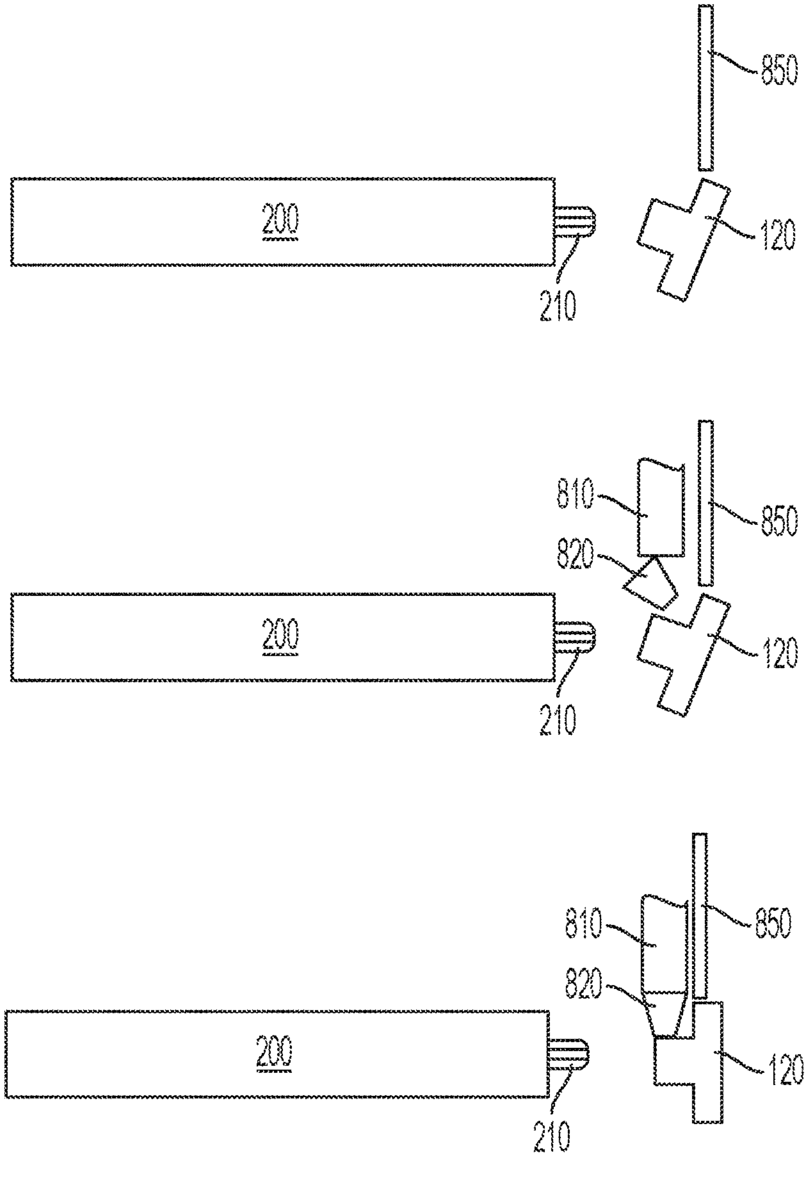

FIGS. 8A and 8B illustrate an attachment and installation of the attachment in an image forming apparatus according to an example.

Referring to FIG. 8A, an attachment 800 includes a mounting portion 810 and a protruding portion 820. In an example, the attachment 800 may be manipulated by a user during an installation of a process cartridge, such as installation of the process cartridge 200 in the image forming apparatus 100.

Referring to FIG. 8B, an example installation of the process cartridge 200 is illustrated. In the illustrated example, the process cartridge 200 has been located in a final position at which the driven gear 210 is to be couped to the driving gear 120. However, the driving gear 120 is in a tilted orientation that prevents coupling to the driven gear 210.

In an example, the image forming apparatus 100 includes an alignment feature 850. The alignment feature 850 may be provided to assist in the installation of the process cartridge 200. For example, the alignment feature 850 may include a guide structure, such as a guiderail, that is to assist with the installation of the process cartridge 200. For example, the process cartridge 200 may include a rail on each lateral side of the process cartridge 200 corresponding to the alignment feature 850. In that case, the rail of the process cartridge 200 may be guided by the alignment feature 850 to guide the process cartridge 200 into a location suitable for an image forming operation.

In another example, the alignment feature 850 may be provided to assist in guiding a structure of a process cartridge that is to provide an aligning force to the driving gear 120. For example, a process cartridge of a previous implementation may be formed having a structure to contact the driving gear during installation of the process cartridge. In that case, the alignment feature 850 may assist in guiding the structure formed as part of the process cartridge to provide the aligning force. However, in a situation in which the process cartridge is not formed with such a structure, the alignment feature 850 may continue to be of use by assisting in the installation of the attachment 800 to provide an aligning force to the driving gear 120.

As illustrated in FIG. 8B, the alignment feature 850 may be provided within the image forming apparatus 100 at a location near the driving gear 120 and the housing 130. In that case, the alignment feature 850 may guide the attachment 800 to provide an aligning force to the driving gear 120. In the illustrated example, the mounting portion 810 may contact the alignment feature 850 as the attachment 800 is pushed into the image forming apparatus 100 toward the driving gear 120. The protruding portion 820 may include a key having a size or a shape corresponding to a size or a shape of the driving gear 120 or corresponding to a size or a shape of the housing 130 or the opening 131 of the housing 130. For example, the protruding portion 820 may include a key having a circular cross-section of a diameter that can be received within the opening 131 of the housing 130. In that case, as the mounting portion 810 is pushed into the image forming apparatus 100 and towards the driving gear 120 while being guided by the alignment feature 850, the protruding portion 820 including the key may contact the driving gear 120 through the opening 131. By contacting the driving gear 120 with the protruding portion 820, the protruding portion 820 may provide an alignment force to the driving gear 120.

In various examples, based on the attachment 800 being used to provide an alignment force to the driving gear 120, the attachment 800 may remain within the image forming apparatus 100 or may be withdrawn from the image forming apparatus 100. For example, the mounting portion 810 of the attachment 800 may contact the alignment feature 850 while being pushed into the image forming apparatus 100 to contact the driving gear 120 and provide an aligning force to the driving gear 120. Based on providing the aligning force to the driving gear 120, the attachment 800 may remain within the image forming apparatus 100. For example, the attachment 800 may remain in a location at which the mounting portion 810 is in contact with the alignment feature 850 and at which the protruding portion 820 is in contact with the driving gear 120.

In another example, the attachment 800 may be removed from the image forming apparatus 100 based on applying the aligning force to the driving gear 120. For example, a user may insert the attachment 800 into the image forming apparatus 100 to provide the aligning force to the driving gear 120 and proceed to withdraw the attachment 800 after application of the aligning force. In that case, the mounting portion 810 may be guided by the alignment feature 850 as the attachment 800 is withdrawn.

In yet another example, the attachment 800 may remain within the image forming apparatus 100 at a location at which the protruding portion 820 does not contact the driving gear 120. For example, the mounting portion 810 may be guided by the alignment feature 850 as the attachment 800 is inserted into the image forming apparatus 100 toward the driving gear 120. Based on the protruding portion 820 contacting the driving gear 120 to provide an alignment force, the attachment may be withdrawn by a distance such that the protruding portion 820 does not contact the driving gear 120. In that case, the attachment 800 may remain within the image forming apparatus 100 at a location at which the protruding portion 820 does not contact the driving gear 120.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. A mountable set to be mounted in an image forming apparatus, the mountable set comprising:
- a process cartridge having a driven gear, the driven gear to couple with a driving gear of the image forming apparatus and to receive a driving force from the driving gear; and
- an attachment including:
  - a mounting portion including a head portion to mount to an internal component of the image forming apparatus; and
  - a protruding portion, coupled to the mounting portion, to provide an aligning force to the driving gear on a back side of the driving gear through an opening in an interior panel of the image forming apparatus, the back side of the driving gear being opposite to a front side of the driving gear that is to couple with the driven gear.

2. The mountable set of claim 1,
- wherein the head portion is to mount to a side panel of the image forming apparatus.

3. The mountable set of claim 2,
- wherein the mounting portion further includes a stud portion,
- wherein the mounting portion is to mount to the image forming apparatus by at least one of insertion through a hole, an adhesive layer to adhere the head portion to the image forming apparatus, or a mounting device to couple the head portion to the image forming apparatus, and
- wherein the protruding portion is received within an opening in the stud portion, and wherein an urging member is located within the opening in the stud portion and includes an elastic member to provide the aligning force to the protruding portion.

4. The mountable set of claim 2,
- wherein the mounting portion further includes a bracket coupled between the head portion and the protruding portion, and
- wherein the protruding portion extends from the bracket.

5. The mountable set of claim 1, wherein a cross-section of the mounting portion includes a shape corresponding to a shape of a housing of the driving gear.

6. The mountable set of claim 5, wherein the mounting portion is to couple to the housing by at least one of an elastic force of the mounting portion, a double-sided tape, an adhesive, or a mounting device.

7. The mountable set of claim 5,
- wherein the mounting portion is to mount to the housing of the driving gear at a location of the housing having an opening, and
- wherein the protruding portion is to protrude from the mounting portion through the opening to provide the aligning force to the driving gear.

8. The mountable set of claim 7, wherein the protruding portion includes an elastic member to provide the aligning force.

9. The mountable set of claim 1, wherein the protruding portion includes a key to be inserted in the image forming apparatus, and wherein the key is guided by an alignment feature of the image forming apparatus based on being inserted in the image forming apparatus.

10. The mountable set of claim 9, wherein the key is to be removed from the image forming apparatus after providing the aligning force to the driving gear.

11. An attachment to be mounted in an image forming apparatus, the attachment comprising:

a mounting portion including a head portion and a bracket coupled to the head portion, the head portion to mount to an interior panel of the image forming apparatus; and an elastic forcing portion, coupled to and extending from the bracket of the mounting portion, to be located near a driving gear of the image forming apparatus and to provide an elastic aligning force to the driving gear on a back side of the driving gear through an opening in the interior panel.

12. The attachment of claim 11, wherein the mounting portion includes a head portion and a body portion, and wherein the mounting portion has a shape corresponding to a shape of a component of the image forming apparatus.

13. An attachment to mount to an image forming apparatus, the attachment comprising:

a mounting portion including a curved body having a semi-circular form to couple to a curved housing of a driving gear, wherein a radius of the curved body corresponds to a radius of the curved housing, by at least one of an elastic force of the curved body, a double-sided tape, an adhesive, or a mounting device; and a protruding portion, protruding from the mounting portion and extending through an opening in the curved housing, to contact the driving gear and provide an aligning force to the driving gear of the image forming apparatus.

14. The attachment of claim 13, wherein the mounting portion is to mount to the curved housing of the driving gear at a location of the curved housing have an opening, and wherein the protruding portion is to protrude from the mounting portion through the opening to provide the aligning force to the driving gear.

15. The attachment of claim 13, wherein the protruding portion includes an elastic member to provide the aligning force.

* * * * *